United States Patent [19]

Hashimoto

[11] Patent Number: 4,788,713

[45] Date of Patent: Nov. 29, 1988

[54] ONE BUTTON CONTROL SYSTEM FOR TELEPHONE ANSWERING DEVICE

[75] Inventor: Kazuo Hashimoto, Tokyo, Japan

[73] Assignee: Hashimoto Corporation, Tokyo, Japan

[21] Appl. No.: 775,301

[22] Filed: Sep. 12, 1985

[30] Foreign Application Priority Data

Sep. 13, 1984 [JP] Japan ................................ 59-192343

[51] Int. Cl.⁴ ........................ G11B 15/10; G11B 15/02
[52] U.S. Cl. ...................................... 379/70; 360/137; 360/90; 360/62; 379/68
[58] Field of Search ..................... 179/6.01, 6.03, 6.18, 179/6.11; 360/61, 62, 69, 73, 71, 90, 137; 379/68, 70, 85, 77, 75

[56] References Cited

U.S. PATENT DOCUMENTS

| | | | |
|---|---|---|---|
| 3,872,254 | 3/1975 | Murata et al. | 179/6.11 |
| 3,921,214 | 11/1975 | Nyffenegger | 360/62 |
| 4,101,949 | 7/1978 | Cicatelli | 360/137 |
| 4,118,602 | 10/1978 | Jacobson | 360/62 |
| 4,118,745 | 10/1978 | Matsuura | 360/71 |
| 4,328,397 | 5/1982 | Chamberlin | 379/75 |
| 4,336,560 | 6/1982 | Matsumoto | 360/137 |
| 4,404,611 | 9/1983 | Demenus | 360/137 |

FOREIGN PATENT DOCUMENTS 0070949  5/1980  Japan .................. 360/137

Primary Examiner—Raymond F. Cardillo
Assistant Examiner—Robert A. Weinhardt
Attorney, Agent, or Firm—Lowe, Price, Leblanc, Becker & Shur

[57] ABSTRACT

At least two operation buttons are arranged to set one of a plurality of operation modes of a recording/reproducing apparatus. When each operation button operated a plurality of times within a predetermined period of time is detected by a microprocessor, a switching circuit sets a recording medium in a predetermined operation mode determined by the operation/non-operation and the number of operations of each operation button. In the predetermined operation mode, at least one recording medium mounted in the recording apparatus is erased while being rewound or fast forwarded.

7 Claims, 8 Drawing Sheets

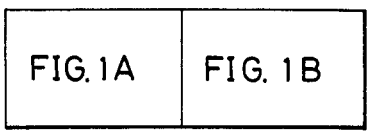
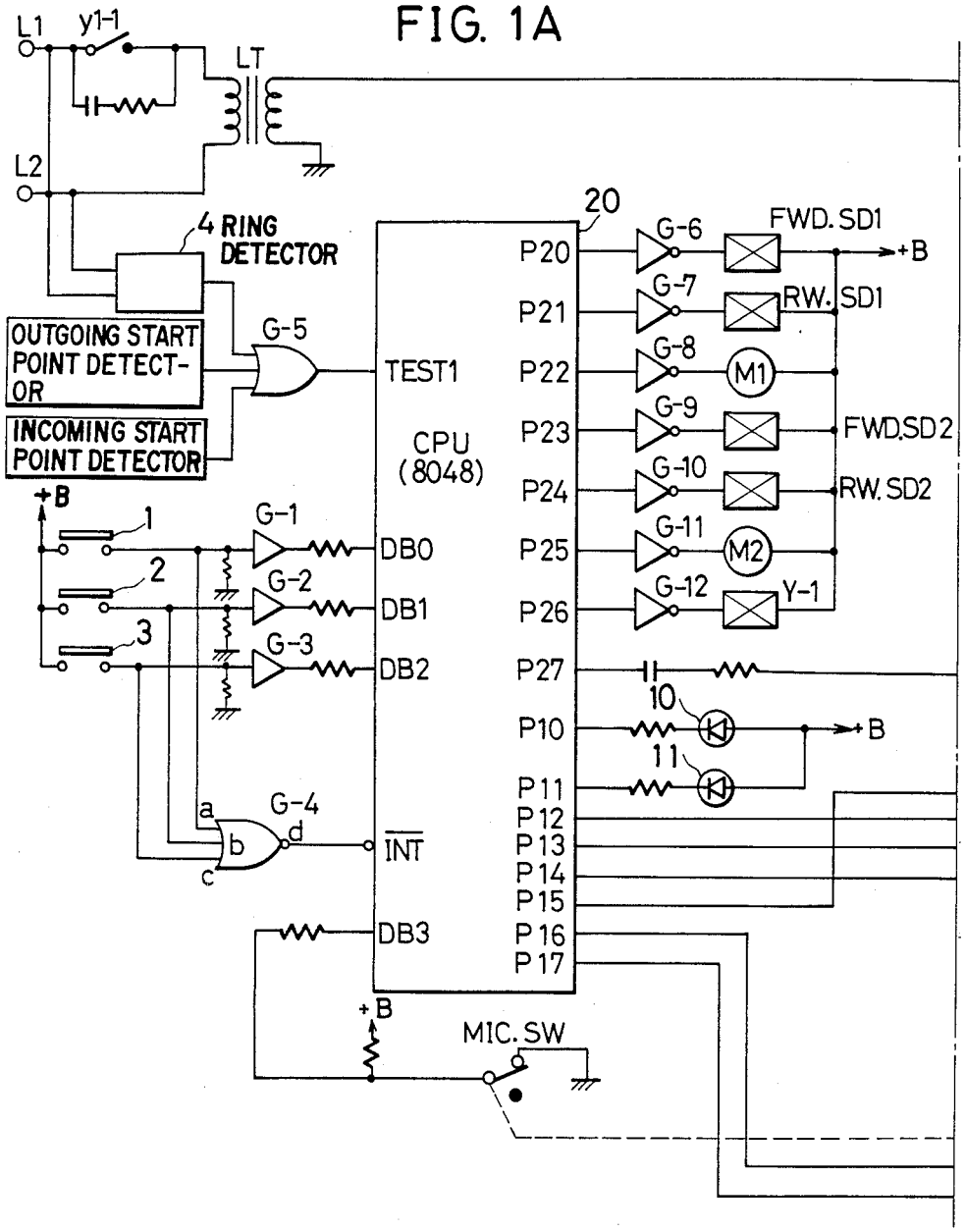

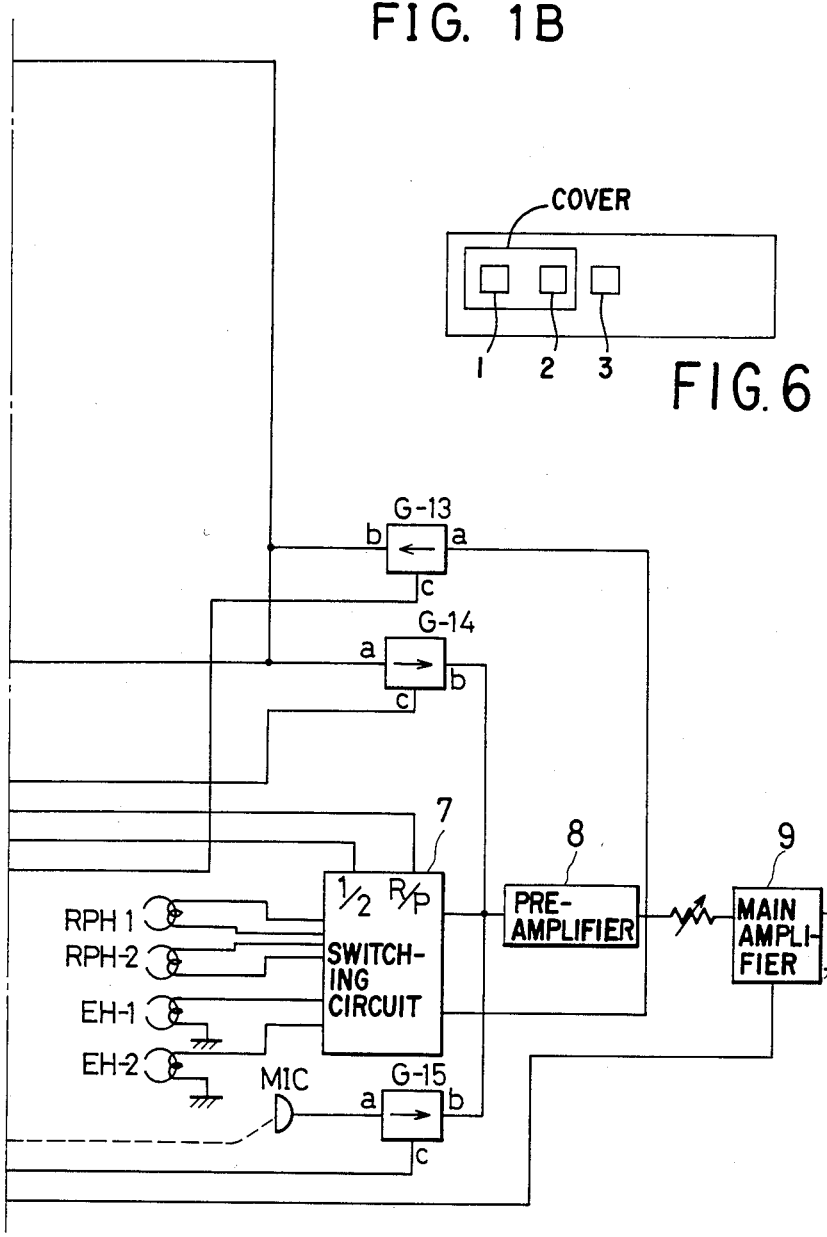
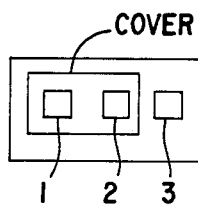
FIG. 1B
FIG. 6

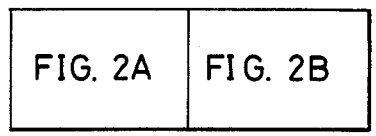
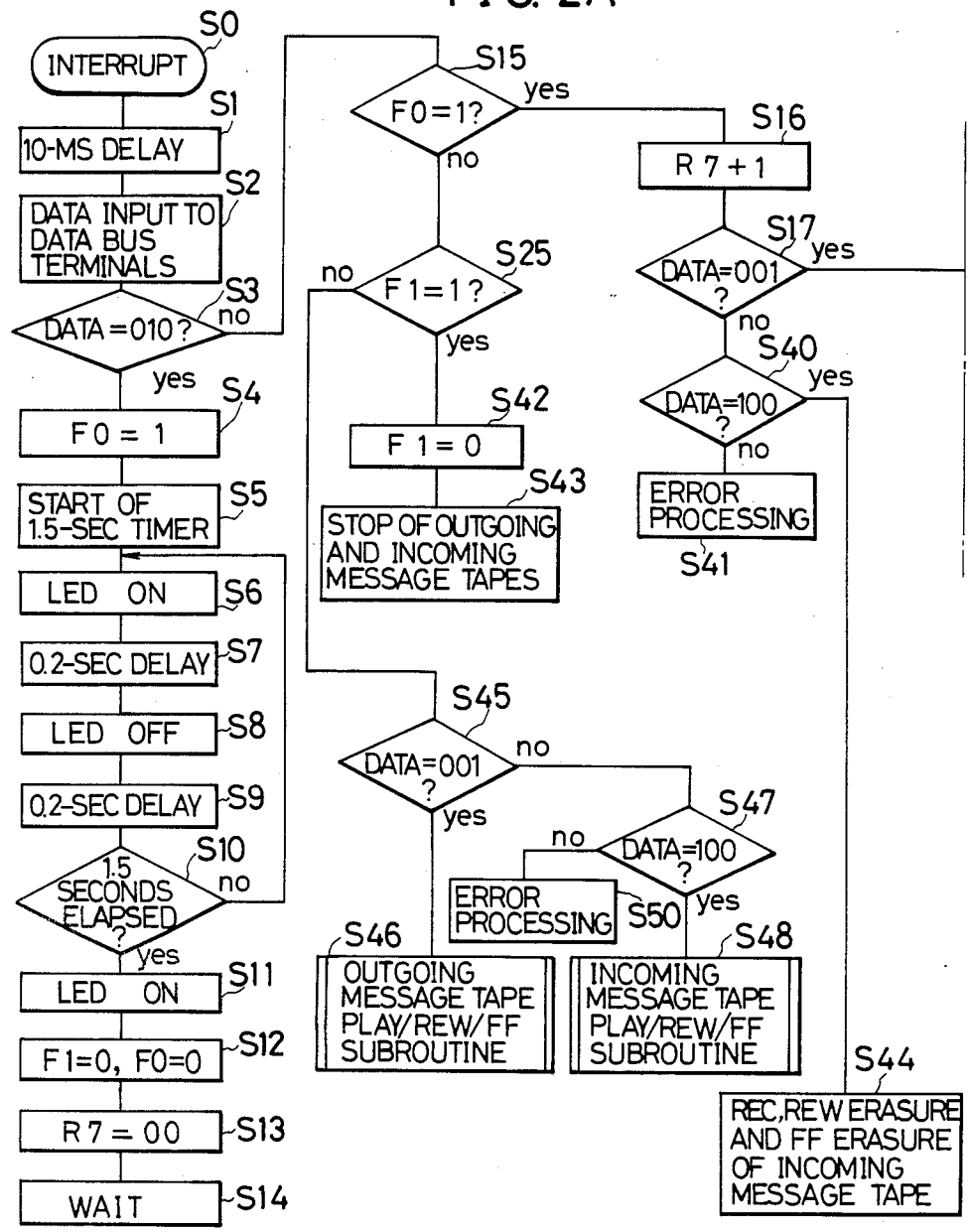

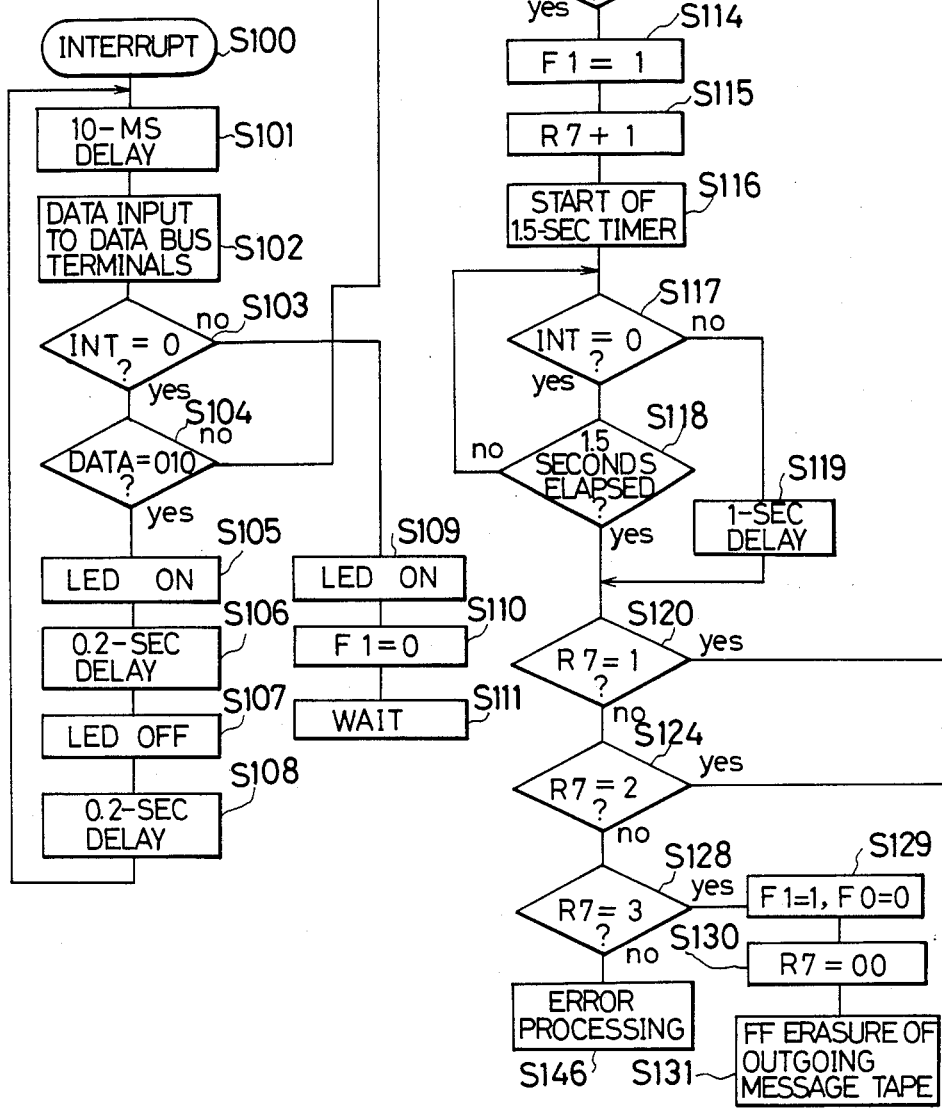

ONE BUTTON CONTROL SYSTEM FOR TELEPHONE ANSWERING DEVICE

This application is related to application Ser. No. 038,459, filed Apr. 8, 1987, which is a continuation of application Ser. No. 648,743, filed Sept. 10, 1984, and now abandoned, application Ser. No. 048,498, filed Apr. 29, 1987, which is a continuation of application Ser. No. 857,766, filed Apr. 29, 1986, and now abandoned, and application Ser. No. 853,409, filed Apr. 18, 1986, and all assigned to the Assignee of this invention.

BACKGROUND OF THE INVENTION

The present invention relates to a recording/reproducing apparatus.

When a recording magnetic tape is played, rewound or fast forwarded in a conventional recording/reproducing apparatus used for an automatic telephone answering device, selection switches arranged in the recording/reproducing apparatus must be selectively operated. For example, a typical conventional telephone answering recording apparatus has outgoing and incoming message tapes. Upon reception of an incoming call, the outgoing message tape is played to send out an outgoing message to a calling party. When the calling party leaves a message, it is recorded in the incoming message tape. Since the outgoing and incoming message tapes must be alternately used, a complicated operation button system is required to achieve the functions described above. A user cannot easily become accustomed to such a recording apparatus, thus preventing widespread application. The conventional recording apparatus requires at least five buttons, i.e., record (REC), play (PLAY), rewind (REW), fast forward (FF), and stop buttons to drive one tape. Even in another type of conventional recording apparatus using an endless tape as the outgoing message tape, at least three buttons are required, i.e., record, play and stop buttons. In general, the incoming message tape does not comprise an endless tape but an open reel type cassette tape. In this case, four or five operation buttons such as REC/PLAY, STOP, REW and FF buttons are required. In addition, at least one or two rotary switches or pushbuttons are required as switches for setting the tapes in automatic operation positions, i.e., for setting the tapes in the automatic answering/recording mode, record and confirm mode of outgoing message tape and play back mode of incoming message tape.

Purchase of such a conventional recording device results in inconvenience, thus preventing widespread home use. U.S. patent application Ser. No. 648,743, now abandoned, (corresponding to British Patent Application No. 8432358) discloses an easily operated automatic recording apparatus for an automatic telephone answering device. In this recording apparatus, an improvement is required for providing a high-speed erasure function so as to achieve higher performance. However, as functions of the conventional recording apparatus were improved, the above-mentioned problems typically occurred.

SUMMARY OF THE INVENTION

The present invention relates to an improvement in an easily operated recording apparatus proposed by the applicant of the present application, and has as its object to provide an easily operated recording/reproducing apparatus which is used in an automatic telephone answering device, which is operated in a plurality of operation modes including a high-speed erasure mode for erasing contents of a magnetic tape at a high speed, and which minimizes the number of operation means from the viewpoint of human technology.

In order to achieve the above object of the present invention, there is provided a recording/reproducing apparatus having at least one magnetic tape and operated in a plurality of modes, comprising: operation selecting means for selecting an operation mode of the recording/reproducing apparatus, the operation selecting means being provided with tape drive control operating means for controlling play and drive of the magnetic tape in accordance with the number of successive operations and recording control operating means for controlling recording and erasure of the magnetic tape; detecting means for detecting the number of successive operations of the operating means in the operation selecting means; and switching means for switching the operation mode in response to an output from the detecting means, wherein the switching means selectively sets the magnetic tape in a play, rewind or fast forward mode in accordance with the number of successive operations of the tape drive control operating means within a predetermined period of time, and the switching means selectively sets the magnetic tape in the record mode, or at least one of a rewind erasure or fast-forward erasure mode in accordance with the operation of the recording control operating means and the number of successive operations of the tape drive control operating means within the predetermined period of time, thereby erasing contents of the magnetic tape at a speed higher than a recording or play speed.

The above and other objects, features and advantages of the present invention will be apparent from the following detailed description in conjunction with the accompanying drawings.

BRIEF DESCRIPTION OF THE DRAWINGS

FIGS. 1A and 1B show a circuit diagram of an automatic telephone answering device according to an embodiment of the present invention;

FIGS. 2A and 2B show a flow chart for explaining a control program executed by a microprocessor of FIG. 1;

FIGS. 5A and 5B show a flow chart for explaining another control program; and

FIG. 6 is a diagram of front panel operation buttons of the apparatus and a protective cover therefor.

DETAILED DESCRIPTION OF THE PREFERRED EMBODIMENTS

Figure 2B:
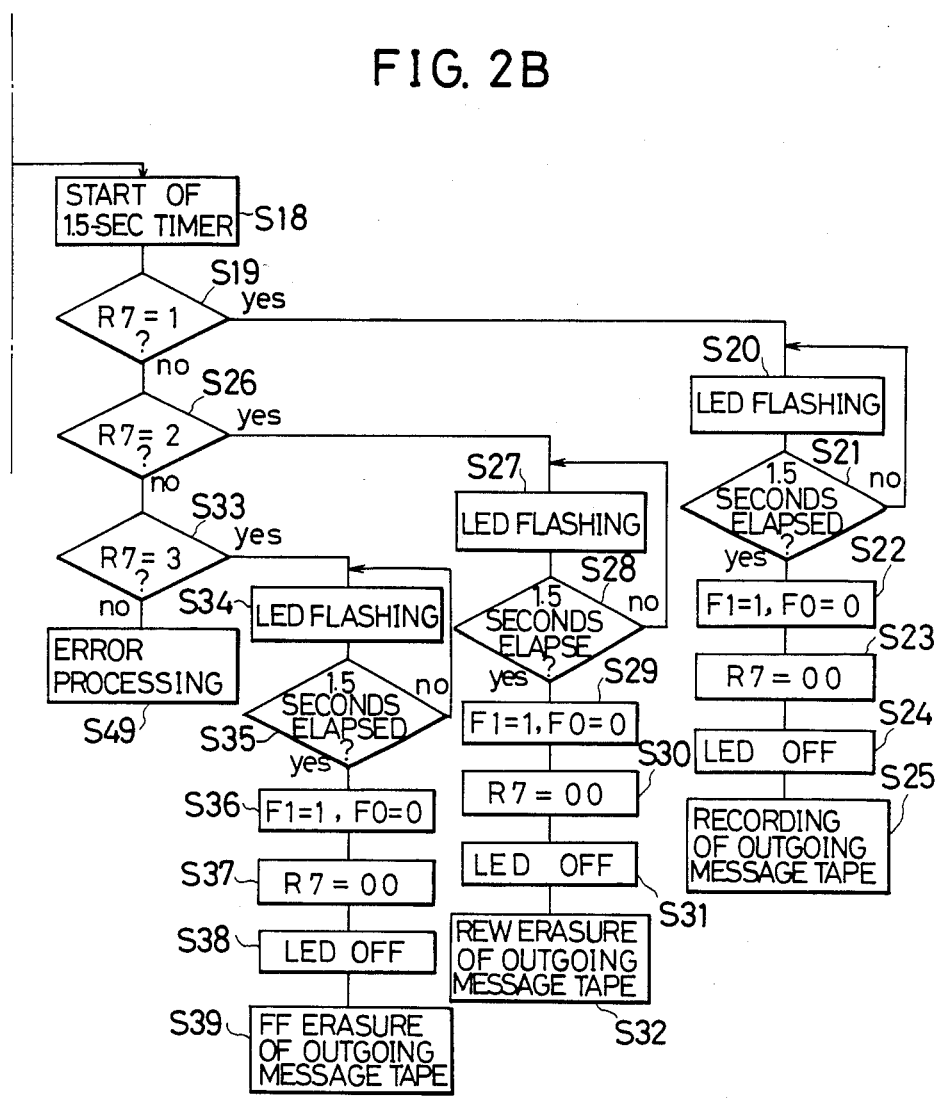

The present invention will be described in detail with reference to a preferred embodiment hereinafter.

FIGS. 1A and 1B show an automatic telephone answering device according to an embodiment of the present invention. Referring to FIGS. 1A and 1B, reference numeral 1 denotes an outgoing message tape operation button switch for selecting one of the operation modes of the outgoing message tape; 2, an automatic operation button switch for setting the apparatus in an automatic answering/recording wait mode and for recording or erasing the outgoing or incoming message tape; and 3, an incoming message tape operation button switch for selecting one of the operation modes of the incoming message tape (See also FIG. 6).

These three buttons are connected to data bus terminals DB0, DB1 and DB2 of a microprocessor 20 (to be referred to as a CPU hereinafter) through buffers G-1, G-2 and G-3, respectively. In this embodiment, the CPU 20 comprises a CPU 8048, e.g. The three buttons are commonly connected to an interrupt terminal INT of the CPU 20 through a NOR gate G-4. A forward drive solenoid FWD.SD1, a rewind solenoid RW.SD1, and a motor M1 are respectively connected to output ports P20 to P22 of the CPU 20 through buffers G-6 to G-8 to drive the outgoing message tape. A forward drive solenoid FWD.SD2, a rewind solenoid RW.SD2 and a motor M2 are respectively connected to output ports P23 to P25 through buffers G-9 to G-11 to drive the incoming message tape. A telephone line engaging relay Y-1 having a relay contact y1-1 is connected to an output port P26 through a buffer G-12. An output port P27 constitutes a beep tone generating terminal.

The outgoing message tape is driven in the forward direction upon energization of the solenoid FWD.SD1 and the motor M1. When the solenoid RW.SD1 and the motor M1 are energized, the outgoing message tape is rewound. When only the motor M1 is energized, the outgoing message tape is fast forwarded. The forward drive, rewind and fast forward operations of the incoming message tape can be performed in the same manner as in the outgoing message tape.

A light-emitting diode 10 connected to an output port P10 is turned on to indicate a selection period of the operation mode of the apparatus when the automatic operation button 2 is depressed. A light-emitting diode 11 connected to an output port P11 is turned on at the start of the outgoing message after the automatic operation button 2 is depressed, thereby indicating that the apparatus is set in the wait mode. Light-emitting diodes for indicating the REC, PLAY, REW and FF modes of the outgoing and incoming message tapes are respectively connected to eight data bus terminals DB0 to DB7 (DB4 to DB7 are omitted) of the CPU 20. Reference symbols RPH-1 and EH-1 denote REC/PLAY and ERASE heads for the outgoing message tape, respectively; and RPH-2 and EH-2, REC/PLAY and ERASE heads for the incoming message tape. Each head is connected to a switching circuit 7 and comprises an analog circuit and a relay. When a control input terminal ½ of the switching circuit 7 is set at H level (logic "1"), the outgoing message tape heads are selected. However, when the terminal ½ is set at L level (logic "0"), the incoming message tape heads are selected. At the same time, when a control input to a control input terminal R/P is set at H level, the REC/PLAY head is set in the REC mode. However, when the terminal R/P is set at L level, the REC/PLAY head is set in the PLAY mode. Reference numeral 8 denotes a preamplifier; 9, a main amplifier; and SP, a loudspeaker. The main amplifier 9 is disabled when the control signal of H level (logic "1") is supplied from an output port P17 of the CPU 20 thereto, thereby preventing howling.

Reference symbols G-13, G-14 and G-15 denote analog switches. When control inputs to control terminals c of the analog switches G-13, G-14 and G-15 respectively connected to output ports P14 to P16 of the CPU 20 are set at H level, input terminals a thereof are electrically connected to output terminals b thereof. Connecting states between telephone lines L1 and L2, the switching circuit 7 and a microphone MIC through the analog switches G-13 to G-15, a line transformer LT and the microphone are switched in accordance with the operating states of these switches G-13, G-14 and G-15. A microswitch MIC.SW connected to the terminal DB3 of the CPU 20 is detachably connected to a MIC plug (not shown). When the microphone MIC is removed from the plug, the microphone switch MIC.SW is set at the lower position, and the data bus terminal DB3 is set at H level. When the operation button switches 2 and 3 are simultaneously or sequentially depressed in this state (the operation will be described in detail later), conversation can be recorded through the telephone lines L1 and L2. When the microphone MIC is plugged in, microphone recording can be performed. Reference numeral 4 denotes a ringing circuit for detecting a ringing signal; 5, a start point detector for the outgoing message tape; and 6, a start point detector for the incoming message tape. The output terminals of the circuit 4 and the detectors 5 and 6 are connected to a terminal TEST1 of the CPU 20 through an OR gate G-5. Reference symbol +B denotes a DC power source for supplying an operating voltage to the respective components.

FIGS. 2A and 2B show a flow chart of a control program executed under the control of the CPU 20 of FIGS. 1A and 1B. The automatic operation switch 2 is first depressed to set an outgoing message tape (not shown) as a tape with ends in the REC mode and to record an outgoing message on the tape. Upon depression of the switch 2, an interrupt signal is supplied to the CPU 20 through terminals b and d of the NOR gate G-4 and the interrupt terminal INT of the CPU 20. The control program runs (step S0). In step S1, 10-ms delay and operation switch chattering prevention are performed. In step S2, data representing the on/off state of the operation button switches 1 to 3 are supplied to the data bus terminals DB0 to DB2. The input data comprises 3-bit data. The least significant bit (LSB) of the 3-bit data is assigned to the outgoing message tape operation button switch 1; the middle bit, to the automatic operation button switch 2; and the most significant bit (MSB), to the incoming message tape operation button switch 3. When each bit is set at logic "1", the corresponding switch is turned on. However, when each bit is set at logic "0", the corresponding switch is turned off. In step S3, the CPU 20 checks whether the input data is "010". The input data is "010", while only the automatic operation button switch 2 is being depressed. In other words, since step S3 is determined to be YES, the flow advances to step S4. In step S4, an automatic operation switch depression check flag F0 is set at logic "1". When the flag F0 is set at logic "1", waiting, recording, FF or REW erasure can be performed. In step S5, a counter/timer (1.5-sec timer) incorporated in the CPU 20 and having a time-up period of 1.5 seconds is started. In step 6, the CPU 20 sets the output port P10 to be logic "0" (i.e., L level) to turn on the light-emitting diode 10. In step S7, 0.2-sec delay is performed. In step S8, the light-emitting diode 10 is turned off. In step S9, 0.2-sec delay is performed again. The CPU 20 checks in step S10 whether or not the 1.5-sec timer is stopped. If NO in step S10, the flow returns to step S6. The light-emitting diode 10 flashes for a maximum of 1.5 seconds. Therefore, the user can know that the apparatus can be set in the WAIT, REC or ERASURE mode. The flashing time (1.5 seconds) of the light-emitting diode 10 can be prolonged by depressing the operation button switch 1 or 3 (to be described later).

For example, when another operation button switch, e.g., the outgoing message tape operation button switch 1 is depressed while the light-emitting diode 10 is flashing, an interrupt signal is supplied to the CPU 20 through terminals a and d of the NOR gate G-4 and the terminal INT of the CPU 20. The flow advances to step S3 through steps S0, S1 and S2. As mentioned above, since only the operation button switch 1 is being depressed, the input data supplied through the data bus terminals DB0 to DB2 is "001" and the flow advances to step S15. Since the flag F0 is set at logic "1" in step S4, the flow advances to step S16. The content of a register R7 as one of the registers in the CPU 20 is incremented by one. The content of the register R7 is cleared to zero upon initialization of the apparatus (the initialization step is not illustrated in the flow chart). The content of the register R7 is set to be "1" (decimal notation) in step S16. The register R7 is used as a counter for storing the number of times of depression of the outgoing message tape operation button switch 1. The CPU 20 checks in step S17 whether or not the operation button switch 1 is being depressed. Step S17 is determined to be YES, and the flow advances to step S18. Depression of the operation button switch 1 is cancelled in about 0.5 seconds. In step S18, the 1.5-sec timer as the timer/counter incorporated in the CPU 20 is started again, another 1.5-sec period is set in the 1.5-sec timer. The CPU 20 checks in step S19 whether or not the content of the register R7 is set to be decimal "1". Since the operation button switch 1 is depressed once, the flow advances to step S20. The same operations as in step S6 to S9 are performed in step S20, although the operations in step S20 are simply described. In step S20, the light-emitting diode 10 flashes.

The CPU 20 checks in step S21 whether or not the 1.5-sec timer is stopped. The light-emitting diode 10 flashes until the 1.5-sec period has elapsed. When the user does not depress the operation button switch 1 and leaves the switch untouched, after 1.5 seconds have elapsed, the flow advances to step S22. In this case, a tape drive check flag F1 is set to be logic "1", so that control data stops drive of the outgoing message tape upon depression of the operation switch 1 during drive of the outgoing message tape. At the same time, in step S14, the automatic operation switch depression check flag F0 set at logic "1" in step S14 is cleared. In step S23, the content of the register R7 is cleared to prevent the number of operations from being erroneously counted for the next operation. In step S24, the light-emitting diode 10 is turned off. In step S25, the outgoing message tape is set in the REC mode. For thrs purpose, the output ports P20 and P22 are set at logic "1" in a software manner and the solenoid FWD.SD1 and the motor M1 are driven. The outgoing message tape is driven in the forward direction at the normal speed. Subsequently, output ports P12 and P13 are set at logic "1" to cause the switching circuit 7 to render the REC/PLAY head RPH-1 and the ERASE head EH-1 operative. At the same time, an output port P16 is set at logic "1" to turn on the analog switch G-15, so that the microphone MIC is rendered operative. The user's message entered at the microphone MIC is recorded by the head RPH-1 in the outgoing message tape.

In order to cancel the REC mode, the operation switch 1 is depressed and then released. Upon this depression, an interrupt signal is supplied to the CPU 20, and thus the program flow advances to step S15 through steps S0, S1, S2 and S3. Since the automatic operation switch depression check flag F0 is cleared in step S22, the program flow advances to step S25. In this case, the CPU 20 checks the logic level of the tape drive check flag F1. Step S22 is determined to be YES, and the flow advances to step S42. The CPU 20 clears the flag F1. The REC mode of the outgoing message tape is cancelled in step S43. For this purpose, the CPU 20 resets the output ports P20 to P25 simultaneously to be logic "0". Therefore, forward driving, rewinding and fast forwarding of the outgoing and incoming message tapes is cancelled. At the same time, the output port P12 can be reset to cancel the REC mode.

The mode of operation for rewinding the outgoing message tape in the ERASE mode (i.e., REW erasure) will be described. The same description as made above will be simplified or omitted hereinafter.

In order to perform REW erasure, the user depresses the automatic operation switch 2 for REW erasure and then releases. In the same manner as in the REC mode, the program flow advances to step S5 through steps S0 to S4. The 1.5-sec timer is started, and the light-emitting diode 10 flashes for a maximum of 1.5 seconds in a loop of steps S6 to S10. When the outgoing message tape operation button switch 1 is depressed once and released while the light-emitting diode 10 is flashing, the count number of the register R7 for storing the number of times of depression of the operation switch 1 is decimal "1". The program flow advances from step S19 to steps S20 and S21. The light-emitting diode 10 flashes for a maximum of 1.5 seconds to indicate the operation mode selection. Therefore, when the outgoing message tape operation button switch 1 is depressed and then released within 1.5 seconds, the interrupt signal is supplied to the CPU 20, so that the program flow advances to step S16 through steps S0, S1, S2, S3 and S15. In step S16, the count of the register R7 is updated to be decimal "2". The flow advances to step S18 through step S17. In step S18, the 1.5-sec timer period is set, and the 1.5-sec timer is started again. In step S19, the count of the register R7 is different from decimal "1", and then the program flow advances to step S26. The CPU 20 determines that the actual count of the register R7 is decimal "2", so that the flow advances to steps S27 and S28. In the same manner as in steps S20 and 21, the light-emitting diode 10 flashes for a maximum of 1.5 seconds. When an additional operation is not performed and 1.5 seconds have elapsed, the program flow advances to step S32 through steps S29, S30 and S31 which correspond to steps S22 to S24. In step S32, the outgoing message tape is erased while it is being rewound (i.e., REW erasure). More specifically, the output ports P21 and P22 of the CPU 20 are set at logic "1" to energize the rewind solenoid RW.SD1 and the motor M1, thereby rewinding the outgoing message tape. At the same time, the output ports P12 and P13 are set at logic "1" to render the ERASE head EH-1 operative. As a result, the outgoing tape is erased while it is being rewound. In order to cancel the REW erasure, the outgoing message tape operation button switch 1 is depressed and released once as described with reference to steps S15, S25, S42 and S43. In this case, the REW erasure may be cancelled in the following manner. An output from the start point detector 5 is generated when the outgoing message tape is rewound up to the start position. This output may be supplied to the CPU 20 through the terminal TEST1, and the start point may be detected by the program executed by the CPU 20. In this manner, the REW erasure can be cancelled when the outgoing message tape is rewound up to the start point.

In order to erase the outgoing message tape in the FF mode, as is apparent from the above-mentioned two cases, the outgoing message tape operation button switch 1 is depressed and released three times. A count of the register R7 through the respective steps described above is decimal "3". The flow advances from step S33 to step S34. After the switch 1 is depressed three times and 1.5 seconds have elapsed, step S35 is determined to be affirmative, i.e., YES. The program flow advances to step S39 through steps S36, S37 and S38 corresponding to steps S22 to S24. In step S39, the outgoing message tape is erased in the FF mode. More specifically, the output port P22 is set at logic "1" to energize the motor M1 so as to fast forward the outgoing message tape. At the same time, the output ports P12 and P13 are set at logic "1" to render the ERASE head EH-1 operative.

In order to set the apparatus in the automatic answering/recording wait mode, the automatic operation button switch 2 is simply depressed once. If no additional operation is performed after the switch 2 is released, the light-emitting diode 10 which is flashing in a loop of steps S6 to S10 is continuously turned on when the output port P10 of the CPU 20 is set at logic "0" after 1.5 seconds have elapsed. The flags F0 and F1 and the register R7 in steps S12 and S13 are cleared, and the apparatus is set in the wait mode in step S14. In this case, the start position of the outgoing message tape can be detected and then the light-emitting diode 11 is turned on, as needed. A detailed description thereof will be omitted since such an operation is not directly associated with the scope of the present invention.

Recording, REW erasure and FF erasure of the incoming message tape will be briefly described hereinafter. In the outgoing message tape, the outgoing message tape operation button switch 1 is depressed to set the input data supplied through the data bus terminals DB0 to DB2 to be "001", and the program flow advances from step S17 to step S18. In this case, recording, REW or FF erasure is selectively performed in accordance with the number of times of depression of the switch 1. However, in the incoming message tape, the incoming message tape operation button switch 3 is depressed, and input data is "100". The program flow advances from step S17 to S40. The CPU 20 determines in step S40 that the input data is "100", and then the program flow advances to step S44. The same operations as in steps S18 to S38 are performed in step S44. In the program for performing such operations for the outgoing message tape, the outgoing message tape is simply replaced with the incoming message tape so as to constitute the operations for the outgoing message tape. These operations are omitted from the flow chart for the incoming message tape.

When the PLAY, REW or FF mode outgoing and incoming message tapes is performed, the automatic operation button switch 2 should not be depressed. In this case, step S4 is bypassed, so that the automatic operation switch depression check flag F0 is set at logic "0". The program flow advances from step S15 to step S25. Even in step S25, the tape is kept stopped, and thus the tape drive check flag F1 is set at logic "0". The flow advances to step S45. When the user depresses the outgoing message tape operation button switch 1, step S45 is determined to be YES. Therefore, the flow advances to subroutine (step S46) for the PLAY, REW or FF mode of the outgoing message tape.

However, when the incoming message tape operation button switch 3 is depressed, the flow advances to step S48 through step S47, and the subroutine (step S48) for the PLAY, REW or FF mode of the incoming message tape. If NO in steps S33, S40 and S47, error processing is performed in steps S49, S41 and S50. Since the PLAY, REW and FF mode of the outgoing and incoming message tapes are described in detail in U.S. patent application Ser. No. 648,743, these modes are briefly described with reference to FIG. 3.

When recording of the outgoing message tape is completed and stopped, and is then played, the tape must be rewound. This operation will be described hereinafter. When the outgoing message tape operation switch 1 is depressed, an interrupt signal is supplied to the CPU 20 as described above. The program flow advances to step S46 through steps S0 to S45 of FIG. 2. The present subroutine is executed in step S46, and the flow advances to step S51 of FIG. 3. A 1-sec timer incorporated in the CPU 20 is started. A register R5 in the CPU 20 is incremented by one in step S52. The content of the register R5 has been cleared to "00" upon initialization of the apparatus. In step S52, the register R5 is therefore set to be decimal "1". The CPU 20 checks in step S53 whether or not one second has elapsed. In order to rewind the outgoing message tape, the operation button switch 1 must be depressed again within one second. As a result, an interrupt signal is supplied again to the CPU 20. The program flow advances from step S0 to step S46. Thereafter, in step S52 of FIG. 3, the content of the register R5 is incremented by one again, and the content is updated to decimal "2". When one second has elapsed in step S53, the program flow advances from step S54 to step S58. In step S58, the CPU 20 determines that the content of the register R5 is equal to decimal "2" and the program flow advances to step S59. In step S59, the automatic switch depression check flag F0 is set at logic "0", and at the same time, the tape drive check flag F1 is set at logic "1". The register R5 is cleared in step S60. In step S61, the outgoing message tape is rewound. More specifically, the solenoid RW.SD1 and the motor M1 are energized to rewind the outgoing message tape. When the tape is rewound to the start point and an output from the start point detector 5 is supplied to the terminal TEST1 of the CPU 20, the CPU 20 detects the start point of the outgoing message tape. In this state, the solenoid RW.SD1 and the motor M1 are automatically stopped under the control of the CPU 20. Alternatively, the operation button switch 1 is depressed once to cancel the REW mode described above without using the output from the detector 5.

In order to play the outgoing message recorded in the outgoing message tape rewound to the start point and check the recorded content, the operation button switch 1 can be depressed once, as described above. An interrupt signal is supplied to the CPU 20 upon depression of the switch 1. In response to the interrupt signal, the program advances to step S46 through steps S0 through S45 of FIG. 2A under the control of the CPU 20, and the present subroutine is executed. The content of the register R5 is set to be decimal "1", since the operation button switch 1 is depressed once. The program flow advances to step S55 of FIG. 3. In step S55, the flags F0 and F1 are set to be logic "0" and logic "1", respectively. In step S56, the register R5 is cleared. In step S57, the solenoid FWD.SD1 and the motor M1 are energized, and at the same time the head RPH-1 is operated in the PLAY mode, thereby playing the outgoing message tape.

In order to fast forward the outgoing message tape, the tape is temporarily stopped in the above operation and the operation button switch 1 is depressed three times. As is readily understood from the above description, the content of the register R5 is set to be decimal "3". The flow advances from step S58 to step S64 through steps S62 and S63 corresponding to steps S55 and S56. In step S64, the motor M1 is energized to fast forward the outgoing message tape.

Figure 3:
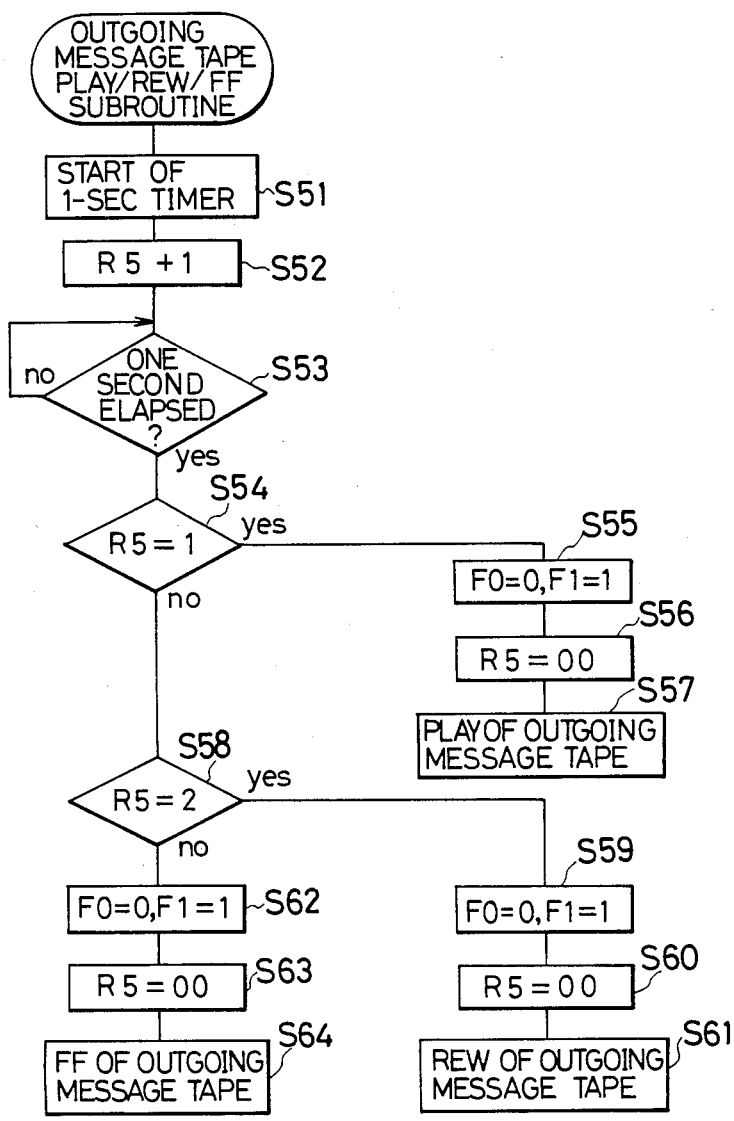
FIG. 3 is a flow chart for explaining subroutines for PLAY, REW and FF modes of an outgoing message tape.
Figure 4:
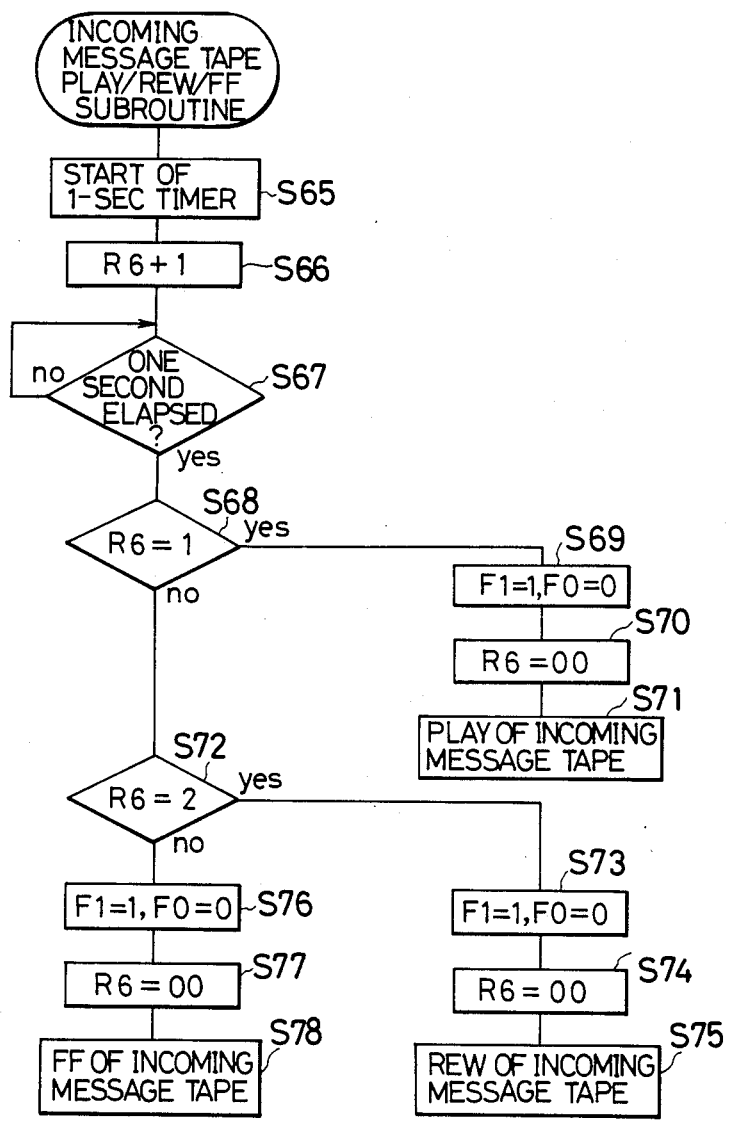
FIG. 4 is a flow chart for explaining subroutines for PLAY, REW and FF modes of an incoming message tape.

In order to play the incoming message tape, the operation button switch 3 is depressed once. However, the operation button switch 3 is depressed twice and three times for the REW and FF modes, respectively. The subroutine flow chart of this operation is illustrated in FIG. 4. The subroutine in FIG. 4 is substantially the same as that of FIG. 3. Steps S65 to S78 correspond to steps S51 to S64 of FIG. 3. A register R6 incorporated in the CPU 20 is used in place of the register R5.

Figure 5B:
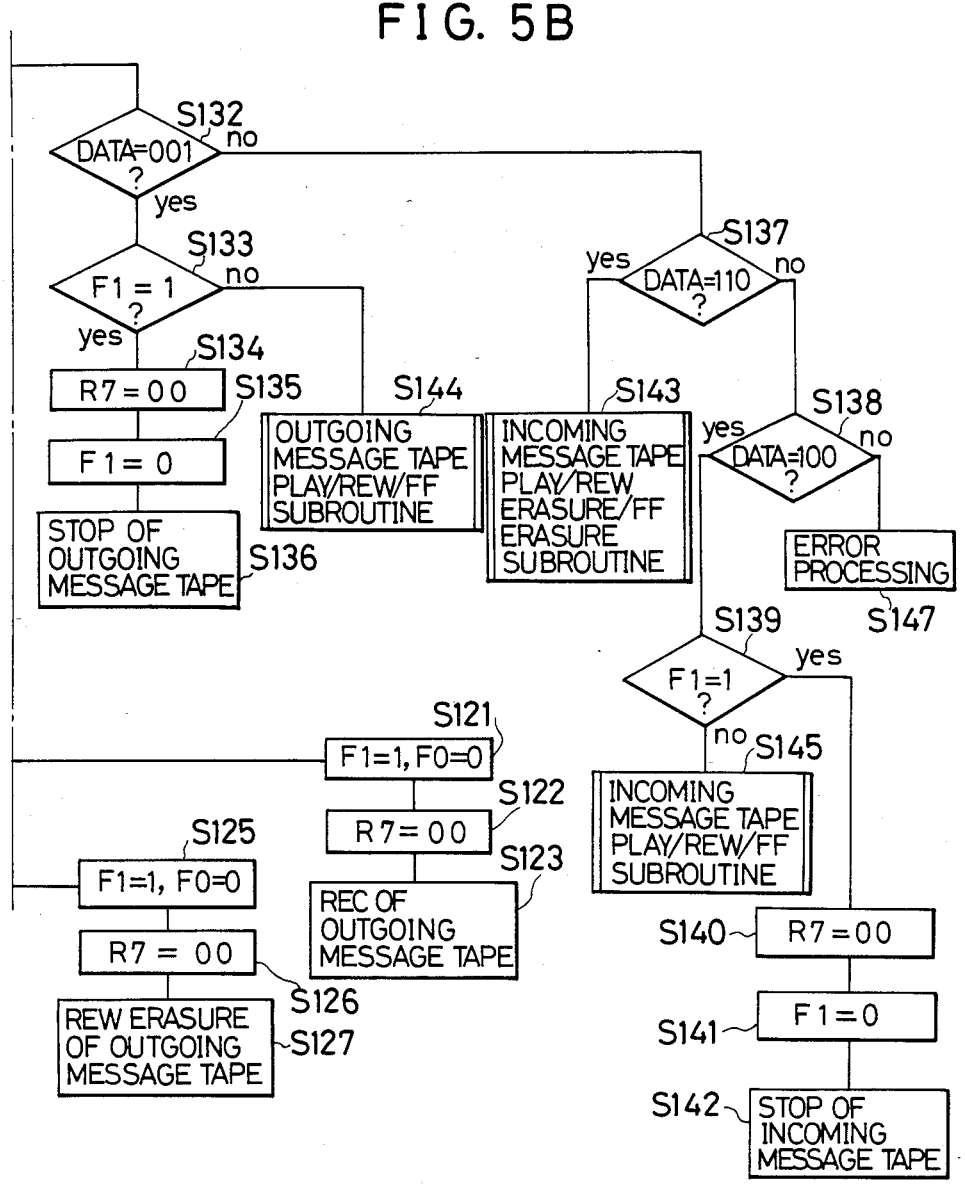

A second embodiment of the present invention will be described with reference to the flow chart of FIG. 5. In the first embodiment of FIGS. 2A and 2B, the automatic operation button switch 2 is depressed to perform recording, REW or FF erasure of the outgoing and incoming message tapes, and the outgoing message tape operation button switch 1 and the incoming message tape operation button switch 3 are selectively depressed once, twice or three times within a predetermined period of time. However, in the second embodiment of FIGS. 5A and 5B, the operation button switch 2 is simultaneously depressed with the operation button switch 1 or 3 once, twice or three times within a predetermined period of time.

When the operation button switch 2 is depressed, an interrupt signal is supplied to the CPU 20 in the same manner as in FIGS. 2A and 2B. The program flow advances from step S100 to S102 through step S101. In step S102, input data representing the operating states of the operation button switches 1 to 3 is supplied to the CPU 20. The CPU 20 checks in step 103 whether or not the logic level of the terminal INT thereof is set at logic "0". As long as the automatic operation button switch 2 is being depressed, the terminal INT is kept at logic "0" and the flow advances to step S104. The CPU 20 compares the input data with the discrimination condition in step S104. Step S104 is determined to be YES, so that the light-emitting diode 10 flashes in steps 105 to 108, and the flow returns to step S101. This operation is repeated. In this state, when the operation buttons 2 and 1 are simultaneously depressed, the input data is "011". The input data is determined to be different from the discrimination condition of step S104, and then the flow advances from step S104 to step S113. In step 113, the input data is discriminated to coincide with the discrimination condition. The program flow advances to step S114, and the tape drive check flag F1 is set to be logic "1". The count of the register R7 used as the counter in step S115 is incremented by one. In step S116, the 1.5-sec timer constituted by the timer/counter is started. The CPU 20 checks in step S117 whether or not the logic level of the terminal INT of the CPU 20 is set at logic "0". As long as the automatic operation button switch 2 is being depressed, the flow advances from step S117 to step S118. The CPU 20 checks in step S118 whether or not the timer is stopped or 1.5 seconds have elapsed. If NO in step S118, i.e., when the CPU 20 determines that 1.5 seconds have not elapsed from depression of the operation switch 1, the flow returns to step S117. In step S117, the CPU 20 determines the logic level of the terminal INT. In order to set the outgoing message tape in the REC mode, one of the following two alternative decision blocks must be performed. The CPU 20 determines in step S118 that 1.5 seconds have elapsed while the operation button switches 1 and 2 are being depressed. Alternatively, the operation button switches 1 and 2 are released, one-second delay is performed in step S119, and the CPU 20 determines in step S120 that the count of the register R7 is set to be decimal "1". Since YES in step S120, the same operations as in steps S22 and S23 are performed in steps S121 and S122. In step S123, the outgoing message tape is set in the REC mode.

As is apparent from the description and flow chart described above, the operation button switches 2 and 1 are simultaneously depressed. When the switches 1 and 2 are depressed again within one second, the count of the register R7 is updated to decimal "2". The program flow advances to step S127 through steps S124 to S126, so that the outgoing message tape can be erased while it is being rewound. When the operation button switches 1 and 2 are simultaneously depressed again, the count of the register R7 is updated to decimal "3". The program flow advances to step S131 through steps S128 to S130. In step S131, the outgoing message tape is erased while it is being rewound.

When the automatic operation button switch 2 and the incoming message tape operation button switch 3 are simultaneously depressed, the program flow advances to step S143 through steps S100 to S104, S113, S132 and S137. The same operations as in steps S114 to S131 are performed in step S143. The incoming message tape is recorded, or REW or FF erased in accordance with the number of times of depression of the switch 3.

When one of the outgoing and incoming message tapes is driven and a corresponding one of the switches 1 and 3 is depressed, the tape drive is stopped (steps S132 to S142). When the tape is stopped and the switch 1 or 3 is depressed, the program flow advances to step S144 corresponding to step S46 of FIG. 2A or step S145 corresponding to step S48 of FIG. 2A. The subroutine shown in FIG. 3 or 4 is executed. The selected tape is played, rewound or fast forwarded. Error processing is performed in steps S146 and S147.

A means different from that of the second embodiment will be described as a modification of the second embodiment. In this modification, when the operation button switch 1 is successively depressed twice while the automatic operation button switch 2 is being depressed, the outgoing message tape can be erased while it is being rewound. For this purpose, "INT=0" in step S117 of FIG. 5A of the second embodiment is replaced with "data="011"". By this modification, every time the automatic operation button switch 2 is depressed, steps S101 to S108 are looped. In this state, when the operation button switch 1 is depressed, steps S117 and S118 are looped through steps S101, S102, S103, S104, S113, S114, S115 and S116 while the switch 1 is being depressed since the input data is "011". Therefore, when the operation button switch 1 is turned off within 1.5 seconds of step S118, the input data is set to be "010". Step S117 is determined to be NO, and the flow advances to step S119. When the operation button switch 1 is depressed within one second of step 119, the flow advances from step S101 to step S117. Step 115 is performed twice, so that the content of the register R7 is set to be decimal "2". When one second has elapsed after the operation button switch 1 is turned off, or 1.5 seconds have elapsed while the operation button switch 1 is kept on, the flow advances to step S124. The outgoing message tape can be erased while it is being rewound.

Furthermore, when an endless tape is used for the outgoing message tape in another modification of the first and second embodiments, the tape need not be rewound. In this case, the operations in steps S26 to S32 in FIG. 2 can be omitted. It is appropriate to erase the tape in the FF mode after the operation button switch 1 is depressed twice. The FF erasure of the outgoing message tape can be omitted. Furthermore, the FF and REW erasure modes may be provided for only the incoming message tape.

However, there are some kinds of telephone answering devices (e.g., CODE-A-Phone Model 2530) which are capable of operating in the automatic operating mode (without pressing the button 2) after manual operation of the outgoing message tape or the incoming message tape. In these and other cases, once an outgoing message is recorded, the outgoing message tape operation button switch 1 is not frequently used. Moreover, the automatic operation button switch 2 is not frequently used either since it is used for manual recording/erasure. In accordance with the present invention, for such cases the button switches 1 and 2 can therefore be protected with a cover or the like (FIG. 6) for a design purpose and as a safety measure for preventing the button switches 1 and 2 from being accidentally operated by children. Only the incoming message tape operation button switch 3 is exposed outside, so that a recording/reproducing apparatus can be simple enough for housewives to use. The simple structure can be achieved in accordance with the principle of the present invention.

Each embodiment described above is exemplified by the automatic telephone answering device. The present invention can also be applied to a normal tape recorder, a disk tape deck or a video recorder. In this case, only one recording medium, i.e., an audio recording tape, an audio/video recording tape is used. Only one operation button (one of the operation buttons 1 to 3 in the embodiment) for playing, rewinding or fast forwarding the tape is required. The automatic operation button serves as the record button. As a result, the REC, PLAY, REW and FF modes can be set with two operation buttons. When the present invention is applied to a so-called double cassette deck or double cassette tape recorder which can use two cassette tapes to perform dubbing each other from one cassette (master tape) to another cassette (slave tape), that is, the outgoing message tape operation button switch 1 serves as a tape operation button for one tape and the automatic operation button switch 2 serves as automatic dubbing operation button, and the incoming message tape operation button switch 3 serves as a tape operation button for the other tape, thereby simplifying the operation of the double cassette deck withot objecting to the spirit of the invention.

What is claimed is:
1. A recording/reproducing apparatus having a housing and at least one recording medium and operable in a plurality of modes, comprising:

operation selection means comprising a manual input means on the housing for selecting an operation mode of said recording/reproducing apparatus, said operation selection means being provided with recording medium drive control operating means for controlling selectively play and drive of the recording medium, and recording control operating means for controlling selectively recording and erasure of the recording medium;

means for establishing a predetermined period of time;

detecting means for detecting the number of successive operations of said manual input means occurring within the predetermined period of time; and switching means for switching the operation mode in response to an output from said detecting means, wherein said switching means selectively sets the recording medium in a play, rewind or fast forward mode in response to the number of successive operations of said manual input means detected by said detecting means within the predetermined period of time, and said switching means selectively sets the recording medium in a record mode, or at least one of either a rewind erasure mode or a fast-forward erasure in response to the operation of said recording control operating means and predetermined numbers of successive operations of said manual input means detected by said detecting means within the predetermined period of time, thereby selectively erasing contents of the recording medium at a speed higher than a recording or play speed.

2. An apparatus according to claim 1, wherein said switching means selectively sets the recording medium in the record mode, the rewind erasure mode or the fast-forward erasure mode in response to the number of successive operations of said manual input means of said drive control operating means detected by said detecting means within the predetermined period of time after said recording control operating means is operated once.

3. An apparatus according to claim 1, wherein said switching means selectively sets the recording medium in the record mode, the rewind erasure mode or the fast-forward erasure mode in response to the number of simultaneous operations of said recording medium drive control operating means and said recording control operating means.

4. An apparatus according to claim 1, wherein said at least one recording medium comprises first and second recording media, said operation selecting means comprises first and second recording media drive control operating means for controlling play and drive states of the first and second recording media and recording control operating means for controlling the record and erasure modes of the first and second recording media, and said switching means selectively sets the first or second recording medium in the play, rewind, or fast forward mode in accordance with the number of successive operations of said manual input means detected by said detecting means within the predetermined period of time and selectively sets the first or second recording medium in the record mode, the rewind erasure mode of the fast-forward erasure mode in response to operation of said recording control operating means and the number of successive operations of said manual input means detected by said detecting means within the predetermined time.

5. An apparatus according to claim 4, wherein said recording/reproducing apparatus includes means for receiving a telephone call; and means for forming an engaging circuit upon reception of a telephone call and upon operation of only said recording control operating means, playing an outgoing message from an outgoing message recording medium as the first recording medium and sending the outgoing message onto a telephone line, and recording an incoming message from a calling party onto an incoming message recording medium as the second recording medium.

6. An apparatus according to claim 5, wherein manual input devices of said first recording medium drive control operating means and said recording control operating means are enclosed by a cover, and only a manual input device of said second recording medium drive control operating means is exposed outside the cover to prevent erroneous operation by a user such as a handicapped or mechanically unsophisticated individual.

7. An apparatus according to claim 6, wherein said incoming and outgoing message recording media comprise magnetic tapes.

* * * * *